US012641348B2

(12) United States Patent
Jörntell et al.

(10) Patent No.: US 12,641,348 B2
(45) Date of Patent: May 26, 2026

(54) DATA PROCESSING SYSTEM FOR PROCESSING PIXEL DATA TO BE INDICATIVE OF CONTRAST

(71) Applicant: IntuiCell AB, Stockholm (SE)

(72) Inventors: Henrik Jörntell, Lund (SE); Udaya Bahskar Rongala, Lund (SE); Elias Högbom Aronsson, Lund (SE)

(73) Assignee: IntuiCell AB, Stockholm (SE)

( * ) Notice: Subject to any disclaimer, the term of this patent is extended or adjusted under 35 U.S.C. 154(b) by 35 days.

(21) Appl. No.: 18/862,971

(22) PCT Filed: Apr. 28, 2023

(86) PCT No.: PCT/SE2023/050406
§ 371 (c)(1),
(2) Date: Nov. 5, 2024

(87) PCT Pub. No.: WO2023/214915
PCT Pub. Date: Nov. 9, 2023

(65) Prior Publication Data
US 2025/0317661 A1    Oct. 9, 2025

(30) Foreign Application Priority Data
May 6, 2022    (SE) .................................... 2250550-7

(51) Int. Cl.
*H04N 25/60*        (2023.01)
*G06N 3/049*        (2023.01)
(Continued)

(52) U.S. Cl.
CPC ............. *H04N 25/60* (2023.01); *G06N 3/049* (2013.01); *G06V 10/50* (2022.01); *G06V 10/62* (2022.01);
(Continued)

(58) Field of Classification Search
CPC ...... H04N 23/54; H04N 23/61; H04N 23/611; H04N 23/617; H04N 23/67; H04N 23/673;
(Continued)

(56) References Cited

U.S. PATENT DOCUMENTS 10,628,699 B2 *    4/2020    Zamir .................... G06V 10/50
11,507,805 B2      11/2022    Rongala et al.
(Continued)

FOREIGN PATENT DOCUMENTS

CN        115004220 A      9/2022
EP        3866105 A1       8/2021
(Continued)

OTHER PUBLICATIONS

Bouvier Maxence; Valentian Alexandre; Sicard Gilles, 1-16 "Scalable Pitch-Constrained Neural Processing Unit for 3D Integration with Event-Based Imagers", 2021 58th ACM/IEEE Design Automation Conference (DAG), Dec. 5, 2021, IEEE, 21462380 Inspec E20214711206381 Compendex; wholedocument.
(Continued)

*Primary Examiner* — Twyler L Haskins
*Assistant Examiner* — Akshay Trehan
(74) *Attorney, Agent, or Firm* — Noréns Patentbyrå AB

(57)        ABSTRACT
The disclosure relates to a data processing system, configured to receive pixel data, comprising central pixel data and neighboring pixel data, from each image of a sequence of images captured by an imaging device as system input and configured to have a system output, comprising: a network comprising: a plurality of input nodes, each input node configured to receive pixel data from a respective pixel as input, each input node comprising an input node leaky integrator, LI, having a first time constant and a weight for the input, and each input node being configured to produce
(Continued)

an input node output by applying the input node LI and a respective weight to the input; and an output node, comprising an output node weight and a multiple input LI having a second time constant, wherein the output node is configured to receive each of the input node outputs, wherein the output node is configured to receive pixel data from the central pixel, wherein the output node is configured to combine the pixel data from the central pixel with the output node weight to produce weighted central pixel data and wherein the output node is configured to apply the multiple input LI to the weighted central pixel data and to each of the node outputs and wherein the output node is configured to produce the system output as a combination of the weighted central pixel data and each of the node outputs; and wherein the second time constant is smaller than the first time constant, and wherein the system output is indicative of a contrast.

19 Claims, 6 Drawing Sheets

(51) Int. Cl.

| | |
|---|---|
| *G06V 10/50* | (2022.01) |
| *G06V 10/62* | (2022.01) |
| *G06V 10/75* | (2022.01) |
| *G06V 20/69* | (2022.01) |
| *H04N 23/54* | (2023.01) |
| *H04N 23/61* | (2023.01) |
| *H04N 23/617* | (2023.01) |
| *H04N 23/67* | (2023.01) |
| *H04N 25/47* | (2023.01) |
| *H04N 25/707* | (2023.01) |

(52) U.S. Cl.
CPC ............. *H04N 23/54* (2023.01); *H04N 23/61* (2023.01); *H04N 23/675* (2023.01); *H04N 25/47* (2023.01); *G06V 10/75* (2022.01); *G06V 20/69* (2022.01); *H04N 23/617* (2023.01); *H04N 25/707* (2023.01)

(58) Field of Classification Search
CPC .... H04N 23/675; H04N 25/47; H04N 25/707; H04N 25/60–683; G06N 3/049; G06V 10/50; G06V 10/62; G06V 10/75; G06V 20/69
See application file for complete search history.

(56) References Cited

U.S. PATENT DOCUMENTS

| | | | | |
|---|---|---|---|---|
| 11,651,199 | B2 * | 5/2023 | Srinivasa | ............. G06V 10/764 706/26 |
| 11,941,510 | B2 | 3/2024 | Rongala et al. | |
| 2008/0258767 | A1 | 10/2008 | Snider et al. | |
| 2012/0131309 | A1 | 5/2012 | Johnson et al. | |
| 2012/0249827 | A1 | 10/2012 | Wootton et al. | |
| 2015/0106306 | A1 | 4/2015 | Birdwell et al. | |

| | | | | |
|---|---|---|---|---|
| 2018/0357504 | A1 * | 12/2018 | Zamir | .................... G06V 10/50 |
| 2019/0244079 | A1 | 8/2019 | George et al. | |
| 2019/0392306 | A1 | 12/2019 | Negishi et al. | |
| 2020/0218959 | A1 * | 7/2020 | Srinivasa | ............ G06F 18/2413 |
| 2021/0142086 | A1 * | 5/2021 | Berkovich | ........... G06V 10/141 |
| 2022/0292331 | A1 | 9/2022 | Zimmermann et al. | |
| 2022/0329847 | A1 | 10/2022 | Parashar et al. | |
| 2022/0374679 | A1 | 11/2022 | Bazhenov et al. | |
| 2023/0079847 | A1 | 3/2023 | Ren | |
| 2023/0087722 | A1 | 3/2023 | Ren | |

FOREIGN PATENT DOCUMENTS

| | | | |
|---|---|---|---|
| JP | 2006285489 | A | 10/2006 |
| JP | 2009027036 | A | 2/2009 |
| JP | 2019040421 | A | 3/2019 |
| WO | 2017148536 | A1 | 9/2017 |
| WO | 2022141445 | A1 | 7/2022 |

OTHER PUBLICATIONS

WO2023214915A1 publication of PCT/SE2023/050406 including the search report, ISA/SE, May 16, 2023 Stockholm Sweden.
Camunas-Mesa Luis A. et al: "A Configurable Event-Driven Convolutional Node with Rate Saturation Mechanism for Modular ConvNet Systems Implementation", Frontiers in Neuroscience, vol. 12, Feb. 20, 2018 (Feb. 20, 2018), pp. 1-19, XP093228823, CH.
Daniel Neil et al: "Deep Neural Networks and Hardware Systems for Event-driven Data" In: "Doctoral Thesis", Jul. 31, 2017 (Jul. 31, 2017), ETH Zurich,XP055571322, pp. 1-154.
Neil Daniel et al: "Minitaur, an Event-Driven FPGA-Based Spiking Network Accelerator", IEEE Transactions on Very Large Scaleintegration (VLSI) Systems, IEEE Service Center, Piscataway, NJ, USA, vol. 22, No. 12, Dec. 1, 2014 (Dec. 1, 2024), pp. 2621-2628, XP011565124, ISSN: 1063-8210, DOI: 10.1109/TVLSI.2013. 2294916 [retrieved on Nov. 20, 2014].
Search report dated Sep. 18, 2024 in GB application 2403874.7, Intellectual property Office UK.
U.S. Appl. No. 18/822,333, filed Sep. 2, 2024, "A method of providing a representation of temporal dynamics of a first system, middleware systems, a controller system, computer program products and non-transitory computer-readable storage media", Intuicell AB.
U.S. Appl. No. 18/836,809, filed Aug. 8, 2024, "A data processing system comprising first and second networks, a second network connectable to a first network, a method, and a computer program product therefor", Intuicell AB.
U.S. Appl. No. 18/840,928, filed Aug. 23, 2024. "A data processing system comprising a network, a method, and a computer program product", Intuicell AB.
U.S. Appl. No. 18/686,897, filed Feb. 27, 2024 "A computer-implemented or hardware-implemented method for processing data, a computer program product, a data processing system and a first control unit therefor", Intuicell AB.
U.S. Appl. No. 18/686,895, filed Feb. 27, 2024 "A computer-implemented or hardware-implemented method, a computer program product, an apparatus, a transfer function unit and a system for identification or separation of entities", Intuicell AB.
U.S. Appl. No. 18/615,189, filed Mar. 25, 2024, "A computer-implemented or hardware-implemented method of entity identification, a computer program product and an apparatus for entity identification", Intuicell AB.

* cited by examiner

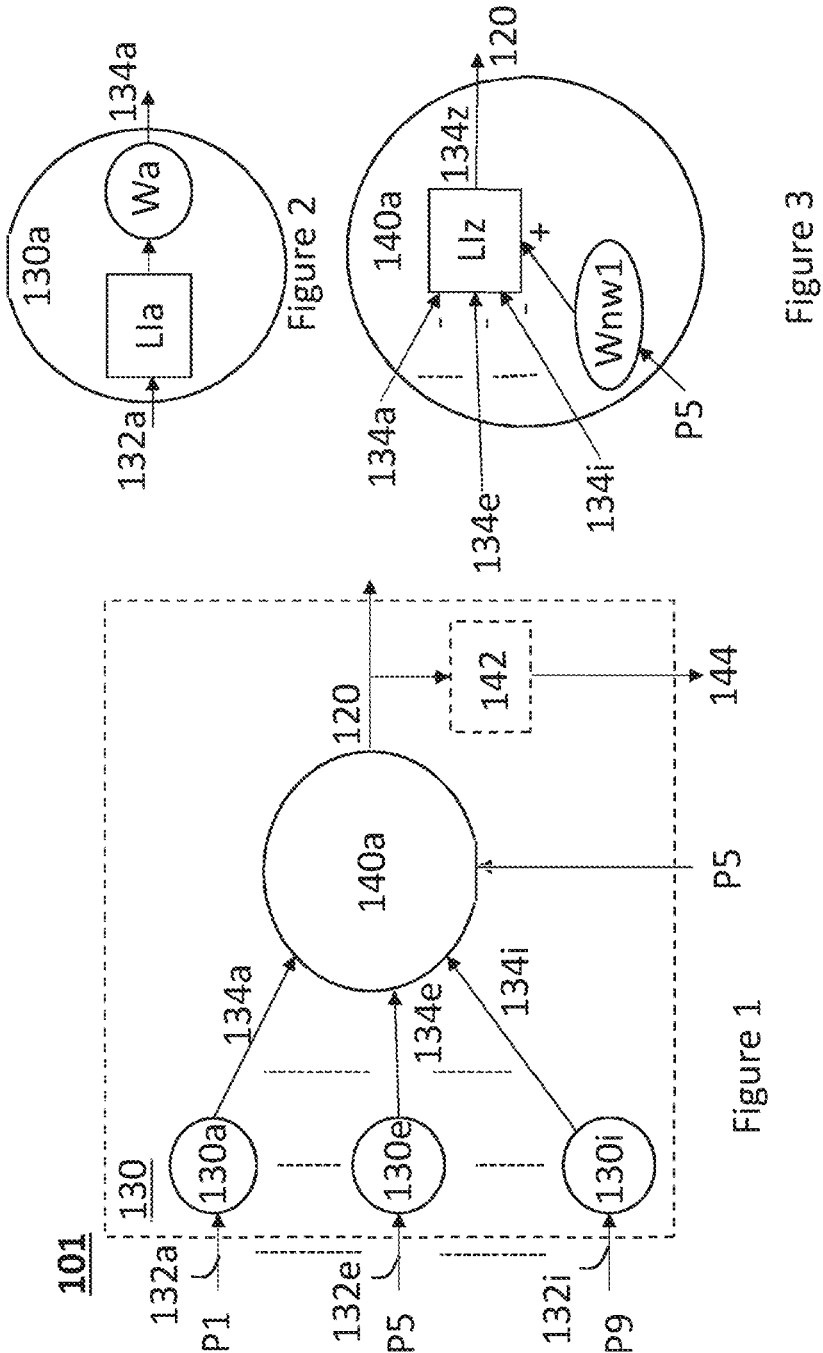

| P51 | P41 | P3 | P2 | P1 |
| P52 | P42 | P6 | P5 | P4 |
| P53 | P43 | P9 | P8 | P7 |
| P54 | P44 | P34 | P24 | P14 |
| P55 | P45 | P35 | P25 | P15 |

Figure 5

| P3 | P2 | P1 |
| P6 | P5 | P4 |
| P9 | P8 | P7 |

310 Receiving PD

320 Providing

330 Applying Lla

340 Receiving INO

345 Receiving CP

350 Combining Wnw1

360 Applying Llz

370 Utilizing

DATA PROCESSING SYSTEM FOR PROCESSING PIXEL DATA TO BE INDICATIVE OF CONTRAST

TECHNICAL FIELD

The present disclosure relates to a data processing system for processing pixel data, a system, an arrangement, methods, a computer program product, and a non-transitory computer-readable storage medium. More specifically, the disclosure relates to a data processing system for processing pixel data, a system, an arrangement, methods, a computer program product, and a non-transitory computer-readable storage medium as defined in the introductory parts of the independent claims.

BACKGROUND ART

Event-based cameras or event cameras are known. Each pixel inside an event camera operates independently and asynchronously, reporting changes in brightness or contrast as they occur, and staying silent otherwise. There are several types of event cameras. One type of event camera is the event-based camera with fixed threshold of contrast. Such a camera is described in Cedric Scheerlinck et al., "Asynchronous spatial image convolutions for event cameras", In: IEEE Robotics and Automation Letters 4(2), pages 816-822, 2019. Another type of event camera is the event-based camera with dynamic threshold of contrast. Such a camera is described in Feng, Yang, et al., "Event density based denoising method for dynamic vision sensor", In: Applied Sciences 10.6, 2020.

However, these types of event-based cameras may be noisy (especially if a high amplification is needed) and/or have high complexity.

Therefore, there may be a need for a (camera) system with reduced noise and/or reduced complexity. Preferably, such systems provide or enable one or more of improved performance, higher reliability, increased efficiency, use of less computer power, use of less storage space, less complexity and/or use of less energy.

US 2021/0142086 A1 discloses an apparatus comprising: an image sensor comprising a plurality of pixel cells; a frame buffer; and a sensor compute circuit configured to: receive, from the frame buffer, a first image frame comprising first active pixels and first inactive pixels, the first active pixels being generated by a first subset of the pixel cells selected based on first programming data; perform an image-processing operation on a first subset of pixels of the first image frame, whereby a second subset of pixels of the first image frame are excluded from the image-processing operation, to generate a processing output; based on the processing output, generate second programming data; and transmit the second programming data to the image sensor to select a second subset of the pixel cells to generate second active pixels for a second image frame.

However, noise may still need to be reduced. Furthermore, better noise stability may be needed. Moreover, the processing in US 2021/0142086 A1 comprises many operations to indicate the contrast (e.g., since the method involves a convolution operation and/or since the method involves operations on blocks of pixels). Thus, there may be a need for faster processing, higher efficiency and/or lower complexity.

SUMMARY

An object of the present disclosure is to mitigate, alleviate or eliminate one or more of the above-identified deficiencies and disadvantages in prior art and solve at least the above-mentioned problem(s).

According to a first aspect there is provided a data processing system for processing pixel data. The data processing system is configured to receive pixel data, comprising central pixel data and neighboring pixel data, from each image of a sequence of images captured by an imaging device as system input and configured to have a system output, comprising: a plurality of input nodes, each input node configured to receive pixel data from a respective pixel as input, each input node comprising an input node leaky integrator having a first time constant and a weight for the input, and each input node being configured to produce an input node output by applying the input node leaky integrator and a respective weight to the input; and an output node, comprising an output node weight and a multiple input leaky integrator having a second time constant, wherein the output node is configured to receive each of the input node outputs, wherein the output node is configured to receive pixel data from the central pixel, wherein the output node is configured to multiply the pixel data from the central pixel with the output node weight to produce weighted central pixel data and wherein the output node is configured to apply the multiple input leaky integrator to the weighted central pixel data and to each of the input node outputs and wherein the output node is configured to produce the system output comprising only differential data generated by subtracting each of the input node outputs ($134a, \ldots, 134i$) from the weighted central pixel data; and wherein the second time constant is smaller than the first time constant, and wherein the system output is indicative of a contrast.

According to some embodiments, the method further comprises obtaining, by applying the leaky integrators and feed the data processing system with pixel data from multiple images, a temporal differential signal indicative of a contrast between the pixels in the same position of the different images.

According to some embodiments, the method further comprises obtaining, by inputting data from a central pixel and data from neighboring pixels to the data processing system, a spatial differential signal indicative of a contrast between the central pixel and the neighboring pixels in the same image.

According to some embodiments, the data processing system comprises a threshold unit configured to receive the system output, and the threshold unit is configured to compare the system output with a threshold and the threshold unit is configured to output a signal indicative of a detected event.

According to some embodiments, the weight of an input node is larger the closer the central pixel is to the pixel.

According to some embodiments, the sum of all weights of the input nodes are equal to the output node weight.

According to a second aspect there is provided a device comprising the data processing system of the first aspect or of any of the above-mentioned embodiments and an imaging device, the imaging device being configured to capture the pixel data and to transmit the captured pixel data to the data processing system.

According to some embodiments, the imaging device is a multiphoton, a laser confocal microscope or a digital video camera.

According to a third aspect there is provided an arrangement comprising: a data processing system of the first aspect or of any of the above mentioned embodiments for each of the pixels of the pixel data; a database comprising images of known objects; and a post-processing unit configured to receive the system output from each of the data processing systems, configured to compare the system output(s) to the images of the known objects, and configured to identify an (unknown/unidentified) object present in the pixel data, based on the comparison, as the known object with the image differing the least from the system output.

According to a fourth aspect there is provided a computer-implemented or hardware-implemented method for processing pixel data. The method comprises: receiving pixel data comprising data from a central pixel and data from neighboring pixels from each image of a sequence of images as system input; providing each of the pixels as input to a respective input node; applying a respective input node leaky integrator, having a first time constant, and a respective weight to each of the inputs, thereby producing an input node output; receiving, by an output node, each of the input node outputs and pixel data from the central pixel; combining (by multiplying) the pixel data from the central pixel with an output node weight, thereby producing weighted central pixel data; applying a multiple input leaky integrator having a second time constant, the second time constant being smaller than the first time constant, to the weighted central pixel data and to each of the input node outputs, thereby combining the weighted central pixel data and each of the input node outputs to produce a system output comprising differential data generated by subtracting each of the input node outputs from the weighted central pixel data; and utilizing the system output to indicate a contrast.

According to a fifth aspect there is provided a computer-implemented or hardware-implemented method for auto-focusing of an imaging device. The method comprises: receiving images of a sequence of images, each image comprising pixel data; determining a size of a preliminary region of interest, ROI, of an image based on a user input; selecting a preliminary ROI based on the determined size; providing each of the pixels of the preliminary ROI as input to a respective input node; applying a respective input node leaky integrator, having a first time constant, and a respective weight to each of the inputs, thereby producing input node outputs; receiving, by an output node, each of the input node outputs and pixel data from the central pixel; combining the pixel data from the central pixel with an output node weight, thereby producing weighted central pixel data; applying a multiple input leaky integrator having a second time constant, the second time constant being smaller than the first time constant, to the weighted central pixel data and to each of the input node outputs, thereby combining the weighted central pixel data and each of the input node outputs to produce a system output comprising differential data generated by subtracting each of the input node outputs (134a, . . . , 134i) from the weighted central pixel data, the system output being indicative of a contrast; storing at a first position of a memory the system output and at a second position of the memory a position of the preliminary ROI if the system output is higher than the value currently stored at the first position of the memory; shifting the preliminary ROI one pixel step; repeating the steps of receiving (410) images, determining, selecting, providing, applying, receiving (435) each of the input node outputs and pixel data from the central pixel, combining, applying, storing, and shifting until a stop criterion is met; setting the position stored at the second position of the memory as a position of an ROI;

scanning through the focal range to find the highest contrast value for the ROI; and utilizing the focal point at the highest contrast, thereby focusing the imaging device.

According to some embodiments, the stop criterion is that all possible ROIs within the pixel data has been checked or that the preliminary ROI has reached an end position.

According to some embodiments, the imaging device is a digital video camera (240).

According to some embodiments, the preliminary ROI is an ROI located in the upper left corner of the images or an ROI located in the lower left corner of the images.

According to a sixth aspect there is provided a computer program product comprising instructions, which, when executed on at least one processor of a processing device, cause the processing device to carry out the method according to the fourth aspect, the fifth aspect, or any of the embodiments mentioned herein.

According to a seventh aspect there is provided a non-transitory computer-readable storage medium storing one or more programs configured to be executed by one or more processors of a processing device, the one or more programs comprising instructions which, when executed by the processing device, causes the processing device to carry out the method according to the fourth aspect, the fifth aspect, or any of the embodiments mentioned herein.

Effects and features of the second, third, fourth, fifth and sixth aspects are to a large extent analogous to those described above in connection with the first aspect and vice versa.

Embodiments mentioned in relation to the first aspect are largely or fully compatible with the second, third, fourth, fifth and sixth aspects and vice versa.

An advantage of some embodiments is that noise is reduced.

A further advantage of some embodiments is that noise sensitivity is improved (e.g., compared to dedicated event-based camera hardware).

Another advantage of some embodiments is that only differential data (both spatially and temporally, i.e., across both the spatial and temporal domains) is output, thus providing the function of an event-based camera (e.g., with lower complexity) and/or reducing the amount of data.

Yet another advantage of some embodiments is that e.g., by combining the data processing system with a digital video camera, the functionality equivalent to an event-based camera is achieved at much lower hardware complexity than in prior art event-based cameras.

Yet a further advantage of some embodiments is that a less complex camera (than the camera utilized as a prior art event-based camera) can be utilized with the same accuracy as a prior art event-based camera.

A further advantage of some embodiments is that noise, such as salt-and-pepper noise, is reduced in environments, such as dark environments, which need high amplification.

Yet another advantage of some embodiments is that noise is reduced for night vision or thermal imaging.

Yet a further advantage of some embodiments is that a moving object can be identified regardless of the speed (e.g., across a 2D plane being parallel to the 2D plane of the sensors). Other advantages of some of the embodiments are better noise stability, faster processing, higher efficiency, lower complexity, improved performance, higher/increased reliability, increased precision, increased efficiency, less computer power needed, less storage space needed, less complexity and/or lower energy consumption.

The present disclosure will become apparent from the detailed description given below. The detailed description and specific examples disclose preferred embodiments of the disclosure by way of illustration only. Those skilled in the art understand from guidance in the detailed description that changes, and modifications may be made within the scope of the disclosure.

Hence, it is to be understood that the herein disclosed disclosure is not limited to the particular component parts of the device described or steps of the methods described since such apparatus and method may vary. It is also to be understood that the terminology used herein is for purpose of describing particular embodiments only and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps. Furthermore, the term "configured" or "adapted" is intended to mean that a unit or similar is shaped, sized, connected, connectable or otherwise adjusted for a purpose.

BRIEF DESCRIPTIONS OF THE DRAWINGS

The above objects, as well as additional objects, features, and advantages of the present disclosure, will be more fully appreciated by reference to the following illustrative and non-limiting detailed description of example embodiments of the present disclosure, when taken in conjunction with the accompanying drawings.

FIG. 1 is a schematic block diagram illustrating a data processing system according to some embodiments;

FIG. 2 is a schematic block diagram illustrating an input node comprised in a data processing system according to some embodiments;

FIG. 3 is a schematic block diagram illustrating an output node comprised in a data processing system according to some embodiments;

FIG. 4 is a schematic drawing illustrating pixel data according to some embodiments;

FIG. 5 is a schematic drawing illustrating pixel data according to some embodiments;

DETAILED DESCRIPTION

Figures 6A, 6B:
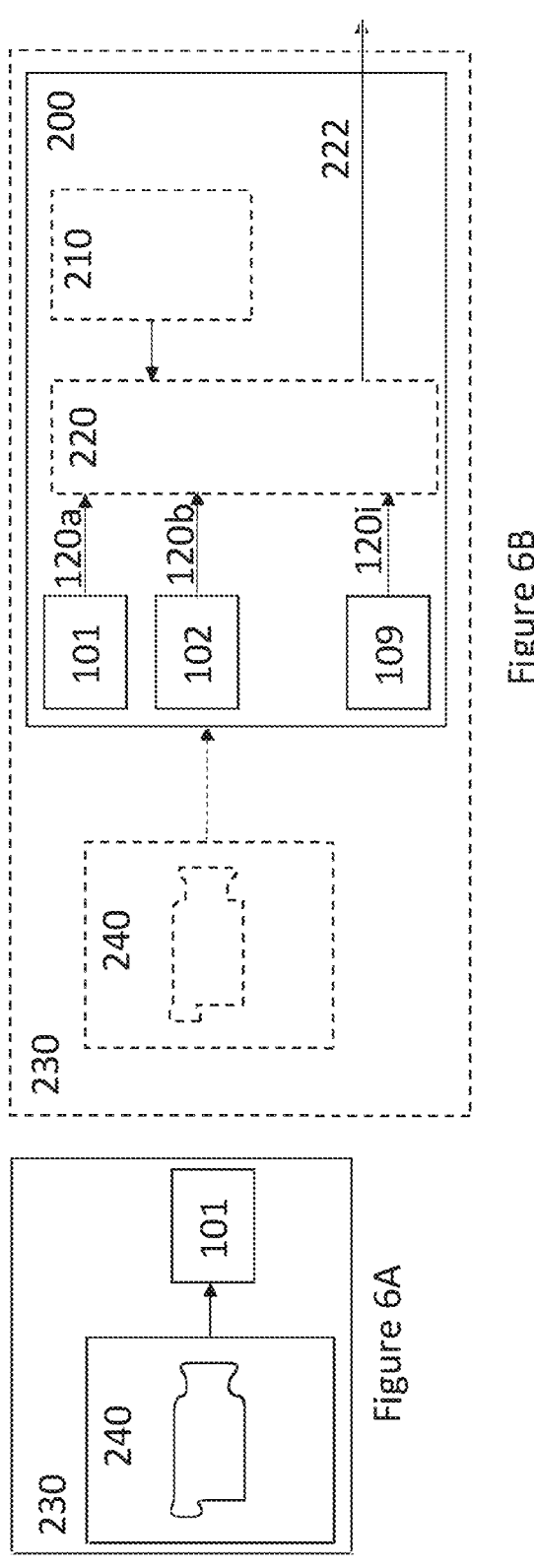
FIG. 6A is a schematic block diagram illustrating a device according to some embodiments.
FIG. 6B is a schematic block diagram illustrating an arrangement according to some embodiments.

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Terminology

Below is referred to a "node". The term "node" may refer to a neuron, such as a neuron of an artificial neural network, another processing element, such as a processor, of a network of processing elements or a combination thereof. Thus, the term "network" (NW) may refer to an artificial neural network, a network of processing elements or a combination thereof.

Below is referred to a "time-lapse sequence". A "time-lapse sequence" is a sequence (of images) for which the frequency at which the images are captured is lower, such as 10 times or 100 times lower, than the frequency used to view the sequence. Thus, when played at normal speed, time appears to be moving faster and thus lapsing. However, a "time-lapse sequence" may also be a sequence (of images) for which the frequency at which the images are captured is the same as the frequency used to view the sequence. Furthermore, a "time-lapse sequence" may also be a sequence (of images) for which the frequency at which the images are captured is higher, such as 10 times or 100 times higher, than the frequency used to view the sequence. Thus, when played at normal speed, time appears to be moving slower, such as in slow motion.

Below is referred to "contrast". A contrast is determined by the difference in the color, brightness and/or (luminous) intensity, e.g., between an object and other objects or between an object and the background within the same field of view, present (temporally and/or spatially) in the photo-detectors of e.g., a charge-coupled device (CCD) sensor or a complementary MOS (CMOS) sensor.

Below is referred to spatial and temporal "differential data". Spatial differential data is the difference between data in a first position and data in a second position, adjacent to the first position (and following the first position, i.e., being below or to the right of the first position). Temporal differential data is the difference between data in a first position of a first image and data in the first position of a second image following the first image (in time or sequence).

Below is referred to "pixel data". Pixel data (datum) from a pixel may be a scalar value, e.g., a grey scale value carrying only a single light intensity value. However, pixel data from a pixel may instead be a set of (light) intensity values, e.g., intensity values of each of 3 different colors, such as RGB.

For illustration purposes only 9 or 25 pixels are depicted in the figures and/or described below for images and regions of interest. However, an image may comprise many pixels, e.g., 1080 by 1080, or 1920 by 1080 or 3840 by 2160. Furthermore, a region of interest may comprise many pixels, e.g., 100 or 1000 or 2000 and may be a square region, a rectangular region, or a circular region.

Embodiments

In the following, embodiments will be described where FIG. 1 is a schematic block diagram illustrating a data processing system 101 according to some embodiments. The data processing system 101 is (configured) for processing pixel data. Furthermore, the data processing system 101 is configured to receive pixel data P1, P2, . . . , P9 (shown in FIG. 4) as system input. The data processing system 101 receives or is configured to receive pixel data P1, P2, . . . , P9 from each image of a sequence of images, e.g., captured by an imaging device. The sequence may be a time-lapse sequence. In some embodiments, the data processing system 101 receives (and processes) one image at a time. Furthermore, the pixel data of each image comprises data from a central pixel P5 and data from neighboring pixels P1, . . . , P4, P6, . . . , P9. Thus, the central pixel P5 is the pixel surrounded by the neighboring pixels P1, . . . , P4, P6, . . . , P9. Moreover, the data processing system 101 is configured to have or has a system output 120. In some embodiments, the data processing system 101 is or comprises a network (NW) 130. In some embodiments, the NW 130 is or comprises a deep neural network, a deep belief network, a deep reinforcement learning system, a recurrent neural network, or a convolutional neural network.

The data processing system 101 (or the NW 130) comprises a plurality of input nodes 130a, . . . , 130e, . . . , 130i. Each input node is configured to receive pixel data from a respective pixel P1, . . . , P9 as input 132a, . . . , 132e, . . . , 132i. Furthermore, each input node 130a, . . . , 130i comprises an input node leaky integrator LIa. This is illustrated in FIG. 2 for the input node 130a. Each input node leaky integrator LIa has a first time constant TC1. The equation for each leaky integrator is of the form $dX/dt=-Ax+C$, where C is the input and A is the rate of the leak. The time constant (i.e., the first time constant TC1) of the leaky integrator is the inverse of the rate of the leak, i.e., 1/A (1 divided by A). Moreover, as illustrated in FIG. 2 (for the input node 130a) each input node 130a, . . . , 130i comprises a respective weight Wa, . . . , Wi for the input 132a, . . . , 132i (to the input node 130a, . . . , 130i). Each input node 130a, . . . , 130i is configured to produce (or produces) an input node output 134a, . . . , 134e, . . . , 134i. Each input node output 134a, . . . , 134i is produced by applying the input node leaky integrator LIa and a respective weight Wa, . . . , Wi to the input 132a, . . . , 132i. In some embodiments, the input 132a, . . . , 132i is first weighted by the respective weight Wa, . . . , Wi and thereafter the respective input node leaky integrator LIa is applied to the weighted input. Alternatively, the input node leaky integrator LIa is first applied to the input 132a, . . . , 132i and thereafter the respective weight Wa, . . . , Wi is applied. Although FIG. 2 only shows the input node 130a, all other input nodes 130b, . . . , 130i functions the same way, i.e., comprises a weight and a leaky integrator (with a time constant TC1).

The data processing system 101 (or the NW 130) comprises an output node 140a. The output node 140a comprises an output node weight Wnw1. Furthermore, the output node 140a comprises a multiple input leaky integrator LIz. An example of a multiple input leaky integrator suitable for the data processing system 101 is given in Udaya Rongala et al., "A Non-spiking Neuron Model with Dynamic Leak to Avoid Instability in Recurrent Networks", https://www.frontiersin.org/articles/10.3389/fncom.2021.656401/full. The multiple input leaky integrator LIz has a second time constant TC2. In some embodiments, the multiple input leaky integrator LIz is a summer with memory and a time constant and the (LIz) equation for each input is of the form $dX/dt=-Bx+C$, where C is the input and B is the rate of the leak. The time constant (i.e., the second time constant TC2) of the multiple input leaky integrator is the inverse of B, i.e., TC2=1/B (1 divided by B). Moreover, the output node 140a is configured to receive (or receives) each of the input node outputs 134a, . . . , 134i. The output node 140a is configured to receive (or receives) pixel data from the central pixel P5. Furthermore, as illustrated in FIG. 3, the output node 140a is configured to combine (or combines) the pixel data from the central pixel P5 with the output node weight Wnw1 to produce weighted central pixel data. In some embodiments, the combining is performed by multiplying the pixel data with the output node weight Wnw1. Moreover, as illustrated in FIG. 3, the output node 140a is configured to apply (or applies) the multiple input leaky integrator LIz to the weighted central pixel data and to each of the input node outputs 134a, . . . , 134i. In some embodiments, the multiple input leaky integrator Liz receives (or is configured to receive) the weighted central pixel data and each of the input node outputs 134a, . . . , 134i, and applies (or is configured to apply) the LIz equation mentioned above to the weighted central pixel data and to all the input node outputs 134a, . . . , 134i. The output node 140a is configured to produce (or produces) the system output 120 as a combination of the weighted central pixel data and each of the input node outputs 134a, . . . , 134i. In some embodiments, the combination is produced by adding or subtracting each of the input node outputs 134a, . . . , 134i to/from the weighted central pixel data. Alternatively, the combination is produced by adding or subtracting the weighted central pixel data to/from a sum of each of the input node outputs 134a, . . . , 134. Subtracting each of the input node outputs 134a, . . . , 134i from the weighted central pixel data may in some embodiments be performed by changing the sign of each of the input node outputs 134a, . . . , 134i and then adding each of the input node outputs 134a, . . . , 134i (with changed sign) to the weighted central pixel data. In some embodiments, the second time constant TC2 is different from (smaller than, larger than) the first time constant TC1. In some embodiments, the second time constant TC2 is smaller than the first time constant TC1, e.g., TC2 is 10 times smaller than TC1 or TC2 is 20 times smaller than TC1. TC1 or TC2 is, in some embodiments, approaching zero. The system output is indicative of a contrast. By having a second time constant TC2 which is smaller than the first time constant TC1, noise is reduced (and/or better noise stability is achieved). Furthermore, better noise stability than for (prior art) dedicated event-based camera hardware is achieved. Moreover, by applying the leaky integrators and feed the data processing system 101 with pixel data from multiple (consecutive) images, a temporal differential signal, indicative of a contrast (between the pixels in the same position of the different images) is obtained. By inputting data from a central pixel P5 and data from neighboring pixels P1, . . . , P4, P6, . . . , P9 to the data processing system 101, a spatial differential signal, indicative of a contrast (between the central pixel and the neighboring pixels in the same image) is obtained.

In some embodiments, the data processing system 101 comprises a threshold unit 142. The threshold unit 142 is configured to receive (or receives) the system output 120. Furthermore, the threshold unit 142 is configured to compare (or compares) the system output 120 with a threshold (value). The threshold (value) may be fixed or adaptive, e.g., user-definable. Moreover, the threshold unit 142 is configured to output a signal 144 indicative of a detected event. A detected event may be a (one pixel) object being present in the central pixel P5. Alternatively, a detected event may be that an object has been identified.

In some embodiments, the weight Wa, . . . , Wi of an input node 130a, . . . , 130i is larger the closer the central pixel P5 is to the pixel P1, . . . , P9 associated with the input node 130a, . . . , 130i. As seen in FIG. 5, an image may have 25 pixels (or more). In FIG. 5, the central pixel is P9. The central pixel P9 has 4 4-neighbours P6, P8, P34, P43. Furthermore, the central pixel P9 has 8 8-neighbours P5, P6, P8, P24, P34, P42, P43, P44. Moreover, the central pixel P9 has 24 24-neighbours P1, . . . , P8, P14, P15, P24, P25, P34, P35, P41, . . . , P45, P51, . . . , P55. Thus, in some embodiments, a pixel belonging to the 4-neighbours has a weight which is larger than a weight associated with a pixel belonging to the 8-neighbours but not belonging to the 4-neighbours. Furthermore, in some embodiments, a pixel belonging to the 8-neighbours has a weight which is larger than a weight associated with a pixel belonging to the 24-neighbours but not belonging to the 8-neighbours. Moreover, in some embodiments, a pixel belonging to the 24-neighbours has a weight which is larger than a weight associated with a pixel belonging to 48-neighbours (not shown) but not belonging to the 24-neighbours. The same is applicable for further away neighbors.

In some embodiments, only differential data (differential spatial data and/or differential temporal data) is output from the data processing system 101, i.e., the system output 120 comprising only differential data. The differential data is, in some embodiments, generated by subtracting each of the input node outputs 134$a$, . . . , 134$i$ from the weighted central pixel data. Furthermore, in some embodiments, the sum of all weights Wa, . . . , Wi of the input nodes 130$a$, . . . , 130$i$ is equal to the output node weight Wnw1. By, making the sum of all weights Wa, . . . , Wi of the input nodes 130$a$, . . . , 130$i$ equal to the output node weight Wnw1, only differential data (both spatial and temporal, i.e., both in space and in time) is output from the data processing system 101. E.g., if the central pixel has the same value as the neighboring pixels, the output of the data processing system is zero, whereas if one (or more) neighboring pixel(s) has a value different from the value of the central pixel, the output is different from zero. Thus, the function of an event-based camera is provided.

Referring to FIG. 6A, a device 230 is provided. The device 230 comprises one or more data processing systems 101 (identical to the data processing system 101 described above). Furthermore, the device 230 comprises an imaging device. The imaging device may be a multiphoton microscope, a laser confocal microscope, a telescope, a radio telescope, a thermal/infrared camera, or a digital video camera 240. The imaging device is configured to capture (or captures) the pixel data P1, P2, . . . , P9. Furthermore, the imaging device is configured to transmit (or transmits) the captured pixel data to the one or more data processing system(s) 101. The data processing system(s) 101 is configured to receive the captured pixel data. By combining the data processing system 101 with a digital video camera 240 (or another imaging device), an event-based camera (imaging device) is achieved which has lower complexity than prior art event-based cameras (imaging devices) and/or the requirements of the actual camera (imaging device) are lowered. Furthermore, noise, such as salt-and-pepper noise, is reduced in environments which require high amplification (e.g., of a charge-coupled device sensor, i.e., a CCD sensor, or of photosensors of the CCD, of a photomultiplier, or of similar phototransduction electronics; since high amplification can create high noise levels), such as dark environments, and/or for night vision or thermal imaging.

FIG. 6B illustrates an arrangement 200. The arrangement 200 comprises a data processing system 101, 102, . . . , 109 (as described above in connection with FIGS. 1-5) for each of the pixels P1, P2, . . . , P9 of the pixel data P1, P2, . . . , P9 (for illustration purposes the pixel number and the number of processing systems have been limited to 9, but may be much higher, such as 8294400). Furthermore, in some embodiments, the arrangement 200 comprises a database 210. The database 210 comprises representations/images of known objects. Thus, each representation/image in the database 210 is associated with a known object. Moreover, in some embodiments, the database 210 comprises a post-processing unit 220. The post-processing unit 220 is configured to receive (or receives) the system output 120$a$, 120$b$, . . . , 120$i$ from each of the data processing systems 101, 102, . . . , 109. Furthermore, the post-processing unit

220 is configured to compare (or compares) the system output 120$a$, 120$b$, . . . , 120$i$ to the representations/images of the known objects (e.g., configured to compare each of the system output(s) 120$a$, 120$b$, . . . , 120$i$ with a corresponding pixel of the representations/images of the known objects). Moreover, the post-processing unit 220 is configured to identify (or identifies) an (unknown/unidentified) object (present in the pixel data P1, P2, . . . , P9) based on the comparison. In some embodiments, an object is identified when the difference between the system output 120$a$, 120$b$, . . . , 120$i$ and the representation/image of a known object is smaller than a first threshold (value). In some embodiments, no object is identified if none of the differences between the system output 120$a$, 120$b$, . . . , 120$i$ and each of the representations/images of the known objects is smaller than the first threshold (value). In some embodiments, an (unknown/unidentified) object is identified as the known object (of all objects in the database) with the representation/image differing the least from the system output 120$a$, 120$b$, . . . , 120$i$, e.g., if the difference between the system output 120$a$, 120$b$, . . . , 120$i$ and that representation/image of a known object is smaller than a first threshold (value). In some embodiments, when/if an object in the database 210 has been identified, the post-processing unit 220 outputs a signal 222 indicative of the identified object. In some embodiments, if an object in the database 210 has not been identified (e.g., because the difference between each of the representations/images in the database 210 and the system output 120$a$, 120$b$, . . . , 120$i$ was too large, e.g., larger than a threshold), the post-processing unit 220 outputs a negative signal or a zero signal. Furthermore, in some embodiments, the device 230 comprises the arrangement 200 and the imaging device captures and transmits the pixel data P1, P2, . . . , P9 to each of the data processing systems 101, 102, . . . , 109.

Figure 7:
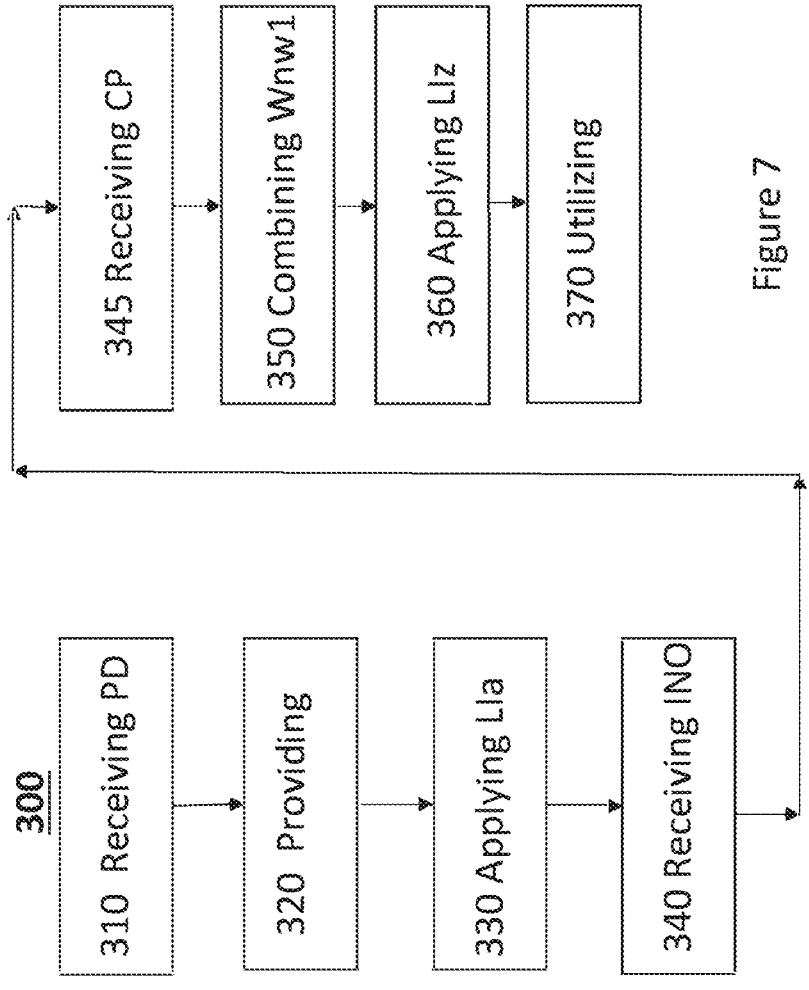
FIG. 7 is a flowchart illustrating method steps according to some embodiments.

FIG. 7 illustrates method steps of a computer-implemented or hardware-implemented method 300 for processing pixel data according to some embodiments. The method 300 comprises receiving 310 pixel data P1, P2, . . . , P9 from each image of a sequence of images as system input. The sequence may be a time-lapse sequence. Furthermore, the sequence is captured by an imaging device. The imaging device may be a multiphoton microscope, a laser confocal microscope, a telescope, or a digital video camera 240. In some embodiments, the sequence is a time-continuous sequence. Furthermore, in some embodiments, the images are received one at a time (starting with the earliest captured image and then receiving images in the order the images have been captured, e.g., in real/time). The pixel data of each image comprising data from a central pixel P5 and data from neighboring pixels P1, . . . , P4, P6, . . . , P9. Moreover, the method 300 comprises providing 320 each of the pixels P1, . . . , P9 as input 132$a$, . . . , 132$i$ to a respective input node 130$a$, . . . , 130$i$, e.g., of the data processing system 101 described above in connection with FIGS. 1-5. The method 300 comprises applying 330 a respective input node leaky integrator LIa, having a first time constant TC1. Furthermore, the method 300 comprises applying a respective weight Wa, . . . , Wi to each of the inputs 132$a$, . . . , 132$i$ (or to an output of the respective input node leaky integrator LIa) to produce an input node output 134$a$, . . . , 134$i$. The weight Wa, . . . , Wi may be applied after or before the respective input node leaky integrator LIa is applied. Thus, in some embodiments, the input 132$a$, . . . , 132$i$ is first weighted by the respective weight Wa, . . . , Wi and thereafter the respective input node leaky integrator LIa is applied to the weighted input. Alternatively, the input node leaky integrator LIa is first applied to the input $132a, \ldots, 132i$ and thereafter the respective weight Wa, . . . , Wi is applied. Moreover, the method 300 comprises receiving 340, by an output node $140a$, e.g., of the data processing system 101 described above in connection with FIGS. 1-5, each of the input node outputs $134a, \ldots, 134i$. The method 300 comprises receiving 345, by the output node $140a$, pixel data from the central pixel P5. Furthermore, the method 300 comprises combining 350 the pixel data from the central pixel P5 with an output node weight Wnw1, thereby producing weighted central pixel data. Moreover, the method 300 comprises applying 360 a multiple input leaky integrator LIz to the weighted central pixel data and to each of the input node outputs $134a, \ldots, 134i$. Thereby the weighted central pixel data and each of the input node outputs $134a, \ldots, 134i$ are combined to produce a system output 120. The multiple input leaky integrator LIz has a second time constant TC2. The second time constant TC2 is smaller than the first time constant TC1. The method 300 comprises utilizing 370 the system output 120 to indicate a contrast. In some embodiments, the method 300 comprises receiving pixel data P1, . . . , P9 from one image at a time. In some embodiments, the method 300 comprises repeating the steps 320-370 until all images of the sequence of images have been processed.

Figure 8:
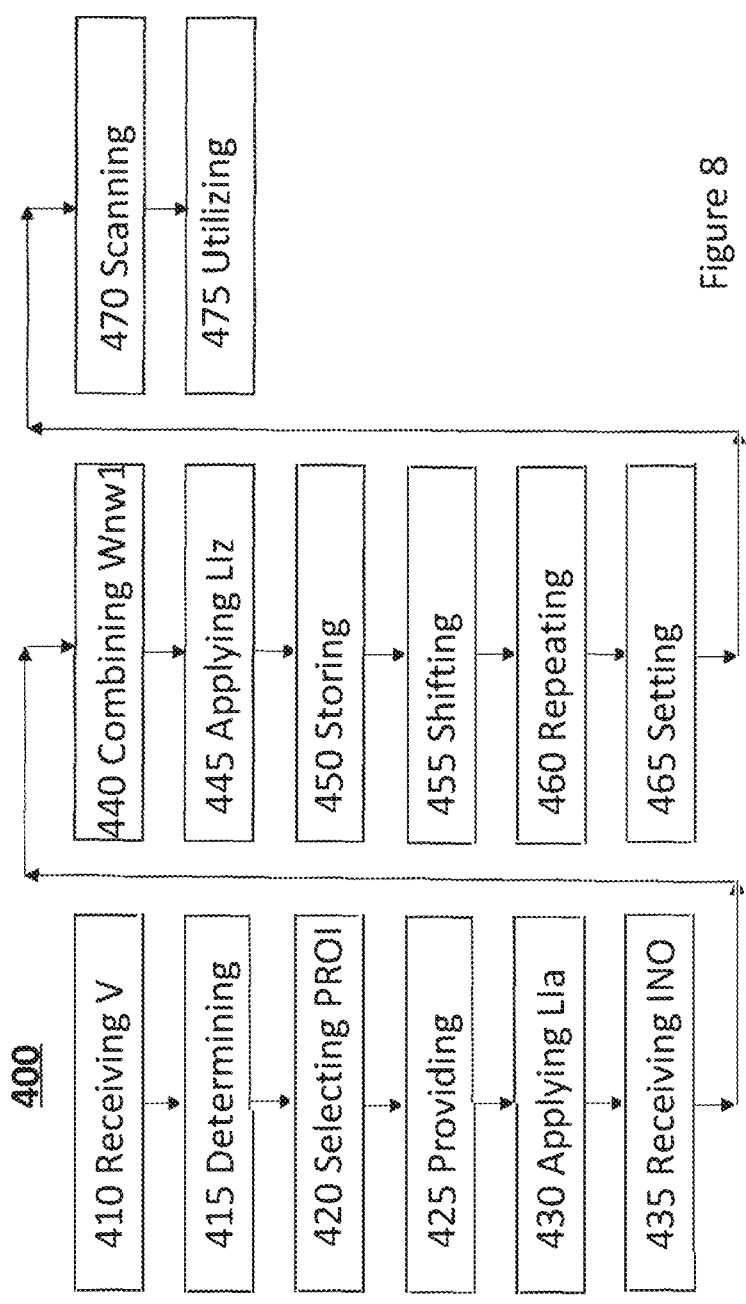
FIG. 8 is a flowchart illustrating method steps according to some embodiments.

FIG. 8 illustrates method steps of a computer-implemented or hardware-implemented method 400 for auto-focusing of an imaging device. The method 400 comprises receiving 410 images of a sequence of images, e.g., time-continuously (on the fly, in real-time). Each image comprises pixel data P1, P2, . . . , P25 (the image may comprise many pixels, e.g., 1080 by 1080, or 1920 by 1080, but for illustration purposes the image size has here been limited to 5 by 5). The sequence may be a time-lapse sequence. Furthermore, the sequence is captured by an imaging device. The imaging device may be a multiphoton microscope, a laser confocal microscope, a telescope, or a digital video camera 240. In some embodiments, the sequence is a time-continuous sequence. Furthermore, in some embodiments, the images are received continuously one at a time (starting with the earliest captured image and then receiving images in the order the images have been captured, e.g., in real-time). Moreover, in some embodiments, the images are images of a continuous stream of video images of a digital camera surrounding. Furthermore, the method 400 comprises determining 415 a size (e.g., 1 by 1, 3 by 3, 5 by 5, or larger) of a preliminary region of interest, ROI, of one or more images. The determining 415 is, in some embodiments, based on a user input, i.e., is user-definable. Alternatively, the determining 415 is automatic and based on an expected size of an object likely to be present in the image(s). Moreover, the method 400 comprises selecting 420 a preliminary ROI P1, . . . , P9 based on the determined size. In some embodiments, the preliminary ROI is selected as the ROI located in the upper left corner of the image(s) (P1, . . . , P9 in FIG. 5). Alternatively, the preliminary ROI is selected as the ROI located in the lower left corner of the image(s). Furthermore, the method 400 comprises providing 425 each of the pixels P1, . . . , P9 of the preliminary ROI as input $132a, \ldots, 132i$ to a respective input node $130a, \ldots, 130i$, e.g., of the data processing system 101 described above in connection with FIGS. 1-5. The method 400 comprises applying 430 a respective input node leaky integrator LIa, having a first time constant TC1, and a respective weight Wa, . . . , Wi to each of the inputs $132a, \ldots, 132i$, thereby producing input node outputs $134a, \ldots, 134i$. The step of applying 430 may be performed as described above in connection with FIGS. 1-5. Furthermore, the method 400 comprises receiving 435, by an output node $140a$, e.g., of the data processing system 101 described above in connection with FIGS. 1-5, each of the input node outputs $134a, \ldots, 134i$ and pixel data from the central pixel P5. Moreover, the method 400 comprises combining 440 the pixel data from the central pixel P5 with an output node weight Wnw1, thereby producing weighted central pixel data. The step of combining 440 may be performed as described above in connection with FIGS. 1-5. The method 400 comprises applying 445 a multiple input leaky integrator LIz having a second time constant TC2, to the weighted central pixel data and to each of the input node outputs $134a, \ldots, 134i$, thereby combining the weighted central pixel data and each of the input node outputs $134a, \ldots, 134i$ to produce a system output 120. The system output is indicative of a contrast. In some embodiments, the second time constant TC2 is smaller than, such as 10 times or 100 times smaller than, the first time constant TC1. Furthermore, the method 400 comprises storing 450 at a first position (or address) of a memory the system output 120 and at a second position (or address) of the memory a position of the preliminary ROI if the system output is higher than the value currently stored at the first position (or address) of the memory. The first position (or address) of a memory may initially be set to 0 or to a large negative number. Moreover, in some embodiments, the method 400 comprises shifting 455 the preliminary ROI one pixel step (down or to the right). One pixel step is, in some embodiments, the smallest change that can be made to the preliminary ROI. E.g., referring to FIG. 5, if the preliminary ROI comprises the pixels P1, . . . , P9 (before shifting 455) the smallest change that can be made to the preliminary ROI may be to shift the pixels so that the preliminary ROI after the shifting 455 comprises the pixels P4, . . . , P9, P14, P24, P34 (i.e., shifting down). Alternatively, if the preliminary ROI comprises the pixels P1, . . . , P9 (before shifting 455) the smallest change will be to shift the pixels so that the preliminary ROI after the shifting 455 comprises the pixels P2, P3, P5, P6, P8, P9, P41, P42, P43 (i.e., shifting to the right). Similarly, if the preliminary ROI comprises the pixels P4, . . . , P9, P14, P24, P34 (before shifting 455) the smallest change may be to shift the pixels so that the preliminary ROI after the shifting 455 comprises the pixels P7, P8, P9, P14, P24, P34, P15, P25, P35. The same order may apply to all other possible preliminary ROIs, i.e., the preliminary ROI (P1, . . . , P9) is either shifted down or to the right in the image (P1, . . . , P55), e.g., alternatively so that when a rightmost position has been reached, the leftmost position of the row below is selected or when a lowest position has been reached, the top position of a column to the right is selected. Alternatively, the method 400 comprises shifting 455 the preliminary ROI two or more pixel steps (down or to the right). By shifting 455 the preliminary ROI two or more pixel steps (down or to the right) instead of one pixel step, the method is made faster, i.e., less time-consuming. The method 400 comprises repeating 460 the steps of 410, 415, 420, 425, 430, 435, 440, 445, 450 and 455 until a stop criterion is met. In some embodiments, the stop criterion is that all possible ROIs within the pixel data has been checked. All possible ROIs for an image with 5 by 5 pixels and a preliminary ROI of the size 1 by 1 are all the 25 pixel positions of the image. Furthermore, all possible ROIs for an image with 5 by 5 pixels and a preliminary ROI of the size 3 by 3 are the 9 possible 3 by 3 pixel blocks comprised in the 5 by 5 pixel block of the image. Thus, with knowledge of the size of the image and knowledge of the size of the preliminary ROI, the number and positions of all possible ROIs can be determined (and processed). In some embodiments, the stop criterion is that the preliminary ROI has reached an end position, e.g., the position in the lower right corner of the image, e.g., where the preliminary ROI comprises the pixels P9, P43, P53, P34 P44, P54, P35, P45, P55. Furthermore, the method 400 comprises (after/when the stop criterion has been met) setting 465 the position stored at the second position/address of the memory as a position of an ROI. This position is the position of the ROI (of all possible ROIs) with the highest/ largest/maximum contrast (for the focal point used during the steps 410-460). Moreover, the method 400 comprises scanning 470 through the focal range to find the highest/ largest/maximum contrast (value) for the ROI (over the focal range). Scanning 470 may comprise scanning the full focal range with incremental steps of e.g., 0.1%, 0.2%, 0.5%, 1%, 2%, 3%, 4%, or 5% of the full focal range and for each step calculate a contrast (value). In some embodiments, the contrast (value) is calculated by the data processing system 101 as described above, e.g., in connection with FIG. 7 and the method 300. Furthermore, in some embodiments, scanning 470 comprises after each incremental step storing at a first position/address of a memory the system output 120 (or the calculated contrast value) and at a second position/ address of the memory the corresponding focal point if the system output is higher than the value currently stored at the first position of the memory. I.e., (only) if the system output (or the calculated contrast value) is higher than the value currently stored at the first position of the memory, the system output (or the calculated contrast value) is stored at a first position/address of the memory and the corresponding focal point is stored at a second position/address of the memory. The first position (or address) of a memory may initially be set to 0 or to a large negative number. The method 400 comprises utilizing 475 the focal point at the highest/largest/maximum contrast (value), i.e., the focal point stored at the second position/address of the memory after scanning 470 has been performed (which is the focal point corresponding to the highest/largest/maximum contrast value over the focal range scanned), to focus the imaging device. I.e., by utilizing 475 the focal point at the highest/largest/maximum contrast, the imaging device is focused. In some embodiments, the method 400 is repeated whenever auto-focusing is determined to be needed.

Figure 9:
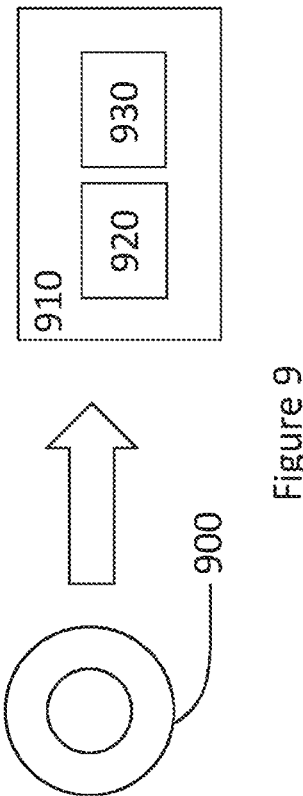
FIG. 9 is a schematic drawing illustrating an example computer readable medium according to some embodiments.

According to some embodiments, a computer program product comprising a non-transitory computer readable medium 900, such as a compact disc (CD) ROM, a read only memory (ROM), a digital versatile disc (DVD), an embedded drive, a plug-in card, a random-access memory (RAM) or a universal serial bus (USB) memory, is provided. FIG. 9 illustrates an example computer readable medium in the form of a compact disc (CD) ROM 900. The computer readable medium has stored thereon, a computer program comprising program instructions. The computer program is loadable into a data processor 920, which may, for example, be comprised in a computer or a computing device 910. When loaded into the data processing unit, the computer program may be stored in a memory 930 associated with or comprised in the data-processing unit. According to some embodiments, the computer program may, when loaded into and run by the data processing unit, cause execution of method steps according to, for example, any of the methods illustrated in FIGS. 7-8, which are described herein. Furthermore, in some embodiments, there is provided a computer program product comprising instructions, which, when executed on at least one processor of a processing device, cause the processing device to carry out the methods illustrated in any of FIGS. 7-8. Moreover, in some embodiments, there is provided a non-transitory computer-readable storage medium storing one or more programs configured to be executed by one or more processors of a processing device, the one or more programs comprising instructions which, when executed by the processing device, causes the processing device to carry out the methods illustrated in any of FIGS. 7-8.

LIST OF EXAMPLES

Example 1

A data processing system (101) for processing pixel data, configured to receive pixel data (P1, . . . , P9), comprising central pixel data (P5) and neighboring pixel data (P1, . . . , P4, P6, . . . , P9), from each image of a sequence of images captured by an imaging device as system input and configured to have a system output (120), comprising:

a plurality of input nodes (130$a$, . . . , 130$i$), each input node configured to receive pixel data from a respective pixel (P1, . . . , P9) as input (132$a$, . . . , 132$i$), each input node (130$a$, . . . , 130$i$) comprising an input node leaky integrator (LIa) having a first time constant (TC1) and a weight (Wa, . . . , Wi) for the input (132$a$, . . . , 132$i$), and each input node being configured to produce an input node output (134$a$, . . . , 134$i$) by applying the input node leaky integrator and a respective weight (Wa, . . . , Wi) to the input (132$a$, . . . , 132$i$); and an output node (140$a$), comprising an output node weight (Wnw1) and a multiple input leaky integrator (LIz) having a second time constant (TC2), wherein the output node (140$a$) is configured to receive each of the input node outputs (134$a$, . . . , 134$i$), wherein the output node (140$a$) is configured to receive pixel data from the central pixel (P5), wherein the output node (140$a$) is configured to combine the pixel data from the central pixel (P5) with the output node weight (Wnw1) to produce weighted central pixel data and wherein the output node (140$a$) is configured to apply the multiple input leaky integrator (LIz) to the weighted central pixel data and to each of the node outputs (134$a$, . . . , 134$i$) and wherein the output node (140$a$) is configured to produce the system output (120) as a combination of the weighted central pixel data and each of the node outputs (134$a$, . . . , 134$i$); and wherein the second time constant (TC2) is smaller than the first time constant (TC1), and wherein the system output is indicative of a contrast.

Example 2

The data processing system of example 1, comprising a threshold unit (142) configured to receive the system output (120), wherein the threshold unit (142) is configured to compare the system output (120) with a threshold and wherein the threshold unit (142) is configured to output a signal (144) indicative of a detected event.

Example 3

The data processing system of any of examples 1-2, wherein the weight (Wa, . . . , Wi) of an input node (130$a$, . . . , 130$i$) is larger the closer the central pixel (P5) is to the pixel (P1, . . . , P9).

Example 4

The data processing system of any of examples 1-3, wherein the sum of all weights (Wa, . . . , Wi) of the input nodes (130*a*, . . . , 130*i*) are equal to the output node weight (Wnw1).

Example 5

A device (230) comprising the data processing system (101, 102, . . . , 109) of any of examples 1-4 and an imaging device, such as a multiphoton microscope or a laser confocal microscope or a digital video camera (240), the imaging device being configured to capture the pixel data (P1, P2, . . . , P9) and to transmit the captured pixel data to the data processing system (101, 102, . . . , 109).

Example 6

An arrangement (200) comprising:
a data processing system (101, 102, . . . , 109) according to any of examples 1-4 for each of the pixels (P1, P2, . . . , P9) of the pixel data (P1, P2, . . . , P9);
a database (210) comprising representations of images of objects; and
a post-processing unit (220) configured to receive the system output (120*a*, . . . , 120*i*) from each of the data processing systems (101, 102, . . . , 109), configured to compare the system outputs (120*a*, . . . , 120*i*) to the images of the objects, and configured to identify an object based on the comparison.

Example 7

A computer-implemented or hardware-implemented method (300) for processing pixel data, comprising:
receiving (310) pixel data (P1, P2, . . . , P9) comprising data from a central pixel (P5) and data from neighboring pixels (P1, . . . , P4, P6, . . . , P9) from each image of a sequence of images as system input;
providing (320) each of the pixels (P1, . . . , P9) as input (132*a*, . . . , 132*i*) to a respective input node;
applying (330) a respective input node leaky integrator (LIa), having a first time constant (TC1), and a respective weight (Wa, . . . , Wi) to each of the inputs (132*a*, . . . , 132*i*), thereby producing an input node output (134*a*, . . . , 134*i*);
receiving (340), by an output node (140*a*), each of the input node outputs (134*a*, . . . , 134*i*) and pixel data from the central pixel (P5);
combining (350) the pixel data from the central pixel (P5) with an output node weight (Wnw1), thereby producing weighted central pixel data;
applying (360) a multiple input leaky integrator (LIz) having a second time constant (TC2), the second time constant (TC2) being smaller than the first time constant (TC1), to the weighted central pixel data and to each of the node outputs (134*a*, . . . , 134*i*), thereby combining the weighted central pixel data and each of the node outputs (134*a*, . . . , 134*i*) to produce a system output (120); and
utilizing (370) the system output (120) to indicate a contrast.

Example 8

A computer-implemented or hardware-implemented method (400) for auto-focusing of an imaging device, such as a digital video camera, comprising:

a) receiving (410) images of a sequence of images, each image comprising pixel data (P1, P2, . . . , P25);
b) determining (415) a size (P1, . . . , P9) of a preliminary region of interest, ROI, of an image;
c) selecting (420) a preliminary ROI (P1, . . . , P9) based on the determined size;
d) providing (425) each of the pixels (P1, . . . , P9) of the preliminary ROI as input (132*a*, . . . , 132*i*) to a respective input node (130*a*, . . . , 130*i*);
e) applying (430) a respective input node leaky integrator, having a first time constant (TC1), and a respective weight (Wa, . . . , Wi) to each of the inputs (132*a*, . . . , 132*i*), thereby producing input node outputs (134*a*, . . . , 134*i*);
f) receiving (435), by an output node (140*a*), each of the input node outputs (134*a*, . . . , 134*i*) and pixel data from the central pixel (P5);
g) combining (440) the pixel data from the central pixel (P5) with an output node weight (Wnw1), thereby producing weighted central pixel data;
h) applying (445) a multiple input leaky integrator (LIz) having a second time constant (TC2), the second time constant (TC2) being smaller than the first time constant (TC1), to the weighted central pixel data and to each of the node outputs (134*a*, . . . , 134*i*), thereby combining the weighted central pixel data and each of the node outputs (134*a*, . . . , 134*i*) to produce a system output (120), the system output being indicative of a contrast;
i) storing (450) at a first position of a memory the system output (120) and at a second position of the memory a position of the preliminary ROI if the system output is higher than the value currently stored at the first position of the memory;
j) shifting (455) the preliminary ROI one pixel step;
k) repeating (460) steps d)-j) until a stop criterion is met;
l) setting (465) the position stored at the second position of the memory as a position of an ROI; and
m) scanning (470) through the focal range to find the maximum contrast for the ROI; and
n) utilizing (475) the focal point at the maximum contrast to focus the imaging device.

Example 9

The computer-implemented or hardware-implemented method of example 8, wherein the stop criterion is that all possible ROIs within the pixel data has been checked.

Example 10

A computer program product comprising a non-transitory computer readable medium (900), having stored thereon a computer program comprising program instructions, the computer program being loadable into a data processing unit (920) and configured to cause execution of the method according to any of examples 7-9 when the computer program is run by the data processing unit (920).

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims.

The invention claimed is:

1. A data processing system for processing pixel data, configured to receive pixel data, comprising central pixel data and neighboring pixel data, from each image of a sequence of images captured by an imaging device as system input and configured to have a system output, the system comprising:

a plurality of input nodes, each input node configured to receive pixel data from a respective pixel as input, each input node comprising an input node leaky integrator having a first time constant and a weight for the input, and each input node being configured to produce an input node output by applying the input node leaky integrator and a respective weight to the input; and an output node, comprising an output node weight and a multiple input leaky integrator having a second time constant, wherein the output node is configured to:

receive each of the input node outputs, receive pixel data from the central pixel, combine the pixel data from the central pixel with the output node weight to produce weighted central pixel data, apply the multiple input leaky integrator to the weighted central pixel data and to each of the input node outputs, and produce the system output as a combination of the weighted central pixel data and each of the node outputs; and wherein the second time constant is smaller than the first time constant, and wherein the system output is indicative of a contrast.

2. The data processing system of claim 1, wherein the method further comprises obtaining, by applying the leaky integrators and feed the data processing system with pixel data from multiple images, a temporal differential signal indicative of a contrast between the pixels in the same position of the different images.

3. The data processing system of claim 1, wherein the method further comprises obtaining, by inputting data from a central pixel and data from neighboring pixels to the data processing system, a spatial differential signal indicative of a contrast between the central pixel and the neighboring pixels in the same image.

4. The data processing system of claim 1, comprising a threshold unit configured to receive the system output, wherein the threshold unit is configured to compare the system output with a threshold and wherein the threshold unit is configured to output a signal indicative of a detected event.

5. The data processing system of claim 1, wherein the weight of an input node is larger the closer the central pixel is to the pixel.

6. The data processing system of claim 1, wherein the sum of all weights of the input nodes are equal to the output node weight.

7. A device comprising the data processing system of claim 1 and an imaging device, the imaging device being configured to capture the pixel data and to transmit the captured pixel data to the data processing system.

8. A device comprising the data processing system of claim 1 and an imaging device, the imaging device being configured to capture the pixel data and to transmit the captured pixel data to the processing system, wherein the imaging device is a multiphoton microscope, a laser confocal microscope or a digital video camera.

9. An arrangement comprising:

the data processing system of claim 1 for each of the pixels of the pixel data;

a database comprising images of known objects; and a post-processing unit configured to receive the system output from each of the data processing systems, configured to compare the system outputs to the images of the known objects, and configured to identify an object present in the pixel data, based on the comparison, as the known object with the image differing the least from the system output.

10. The data processing system of claim 1, wherein the system output produced as a combination of the weighted central pixel data and each of the node outputs comprises differential data generated by subtracting each of the input node outputs from the weighted central pixel data.

11. A computer-implemented method for processing pixel data, the method comprising:

receiving pixel data comprising data from a central pixel and data from neighboring pixels from each image of a sequence of images as system input;

providing each of the pixels as input to a respective input node;

applying a respective input node leaky integrator, having a first time constant, and a respective weight to each of the inputs, thereby producing an input node output;

receiving, by an output node, each of the input node outputs and pixel data from the central pixel;

combining the pixel data from the central pixel with an output node weight, thereby producing weighted central pixel data;

applying a multiple input leaky integrator having a second time constant, the second time constant being smaller than the first time constant, to the weighted central pixel data and to each of the input node outputs, thereby combining the weighted central pixel data and each of the input node outputs to produce a system output; and utilizing the system output to indicate a contrast.

12. A computer program product comprising a non-transitory computer-readable storage medium storing instructions, which, when executed on at least one processor of a processing device, cause the processing device to carry out the method of claim 11.

13. A computer-implemented method for auto-focusing of an imaging device, the method comprising:

receiving images of a sequence of images, each image comprising pixel data;

determining of a preliminary region of interest of an image based on a user input;

selecting a preliminary region of interest, based on the determined size;

providing each of the pixels of the preliminary region of interest as input to a respective input node;

applying a respective input node leaky integrator, having a first time constant, and a respective weight to each of the inputs, thereby producing input node outputs;

receiving, by an output node, each of the input node outputs and pixel data from the central pixel;

combining the pixel data from the central pixel with an output node weight, thereby producing weighted central pixel data;

applying a multiple input leaky integrator having a second time constant, the second time constant being smaller than the first time constant, to the weighted central pixel data and to each of the input node outputs, thereby combining the weighted central pixel data and each of the input node outputs to produce a system output;

storing at a first position of a memory the system output and at a second position of the memory a position of the preliminary region of interest if the system output is higher than the value currently stored at the first position of the memory;

shifting the preliminary region of interest one pixel step;

repeating the steps of receiving images, determining, selecting, providing, applying, receiving each of the input node outputs and pixel data from the central pixel, combining, applying, storing, and shifting until a stop criterion is met;

setting the position stored at the second position of the memory as a position of a region of interest;

scanning through a focal range to find the highest contrast value for the region of interest; and utilizing the focal point at the highest contrast value, thereby focusing the imaging device.

14. The computer-implemented method of claim 13, wherein the stop criterion is that all possible regions of interest within the pixel data has been checked.

15. The computer-implemented method of claim 14, wherein the stop criterion is that the preliminary region of interest has reached an end position.

16. The computer-implemented method of claim 13, wherein the imaging device is a digital video camera.

17. The computer-implemented method of claim 13, wherein the preliminary region of interest is an region of interest located in one of the images.

18. The computer-implemented method of claim 13, wherein the system output produced as a combination of the weighted central pixel data and each of the node outputs comprises differential data generated by subtracting each of the input node outputs from the weighted central pixel data.

19. The computer-implemented method of claim 13, wherein the method is implemented as a hardware-implemented method.

\* \* \* \* \*